United States Patent
Robin et al.

(10) Patent No.: US 9,722,983 B2
(45) Date of Patent: Aug. 1, 2017

(54) METHOD AND DEVICE FOR CONNECTING TO A HIGH SECURITY NETWORK

(75) Inventors: Lionel Robin, Paris (FR); Bruno Larois, Paris (FR); Cédric Couette, Paris (FR); Thomas Monot, Paris (FR)

(73) Assignee: SAGEM DEFENSE SECURITE, Paris (FR)

( * ) Notice: Subject to any disclaimer, the term of this patent is extended or adjusted under 35 U.S.C. 154(b) by 0 days.

(21) Appl. No.: 14/006,394

(22) PCT Filed: Feb. 13, 2012

(86) PCT No.: PCT/EP2012/052411
§ 371 (c)(1),
(2), (4) Date: Nov. 26, 2013

(87) PCT Pub. No.: WO2012/126674
PCT Pub. Date: Sep. 27, 2012

(65) Prior Publication Data
US 2014/0075507 A1   Mar. 13, 2014

(30) Foreign Application Priority Data
Mar. 22, 2011  (FR) ..................................... 11 52369

(51) Int. Cl.
*H04L 29/06* (2006.01)
*H04L 12/24* (2006.01)
*H04L 29/08* (2006.01)

(52) U.S. Cl.
CPC .............. *H04L 63/08* (2013.01); *H04L 41/28* (2013.01); *H04L 63/0209* (2013.01); *H04L 67/2861* (2013.01)

(58) Field of Classification Search
CPC ... G06F 13/426; G06F 9/455; H04L 63/0209; H04L 67/2861
(Continued)

(56) References Cited

U.S. PATENT DOCUMENTS 5,784,562 A * 7/1998 Diener .................... H04L 29/06
709/203
6,058,490 A * 5/2000 Allen .................. G06F 11/0709
714/5.11
(Continued)

OTHER PUBLICATIONS

English-language International Preliminary Report of Patentability for PCT/EP2012/052411 dated Sep. 26, 2013.
(Continued)

*Primary Examiner* — Abu Sholeman
(74) *Attorney, Agent, or Firm* — Nixon & Vanderhye, P.C.

(57) ABSTRACT

The present invention relates to the field of access to a high-security network, and more particularly to a device allowing secure access, for example for management and maintenance operations.

There is described a connection device making it possible to connect any maintenance apparatus to a high-security network without compromising the trust of the system. The device contains a client of the maintenance application package only the inputs-outputs of which are offloaded onto the maintenance apparatus. It has authentication means and means for performing a protocol break between the maintenance apparatus and the high-security system. In this way, only said connection device needs to be trusted and the maintenance may be effected from any terminal.

5 Claims, 4 Drawing Sheets

(58) Field of Classification Search
USPC .............. 726/1, 3, 30; 709/203, 230; 718/1
See application file for complete search history.

(56) References Cited

U.S. PATENT DOCUMENTS

| | | | | |
|---|---|---|---|---|
| 7,565,529 | B2* | 7/2009 | Beck | G06F 21/34 705/55 |
| 7,971,151 | B2* | 6/2011 | Nixon | G05B 19/0426 700/17 |
| 8,739,252 | B2* | 5/2014 | Kuang | H04L 63/06 380/44 |
| 8,875,282 | B2* | 10/2014 | Sinclair | G06F 21/34 713/179 |
| 8,950,007 | B1* | 2/2015 | Teal | G06F 21/554 726/30 |
| 9,348,849 | B1* | 5/2016 | Mandic | G06F 17/30289 |
| 2003/0054798 | A1* | 3/2003 | Kobayashi | H04L 63/0227 455/411 |
| 2003/0065731 | A1* | 4/2003 | Mohammed | G06F 21/33 709/208 |
| 2003/0187619 | A1* | 10/2003 | Lee | H04L 63/083 702/188 |
| 2004/0003262 | A1* | 1/2004 | England | G06F 21/606 713/189 |
| 2004/0122960 | A1* | 6/2004 | Hall | H04L 63/102 709/229 |
| 2004/0153560 | A1* | 8/2004 | Masuhiro | H04L 41/26 709/229 |
| 2004/0153709 | A1* | 8/2004 | Burton-Krahn | H04L 1/22 714/4.11 |
| 2004/0210663 | A1* | 10/2004 | Phillips | H04L 67/1008 709/230 |
| 2004/0250059 | A1* | 12/2004 | Ramelson | H04L 63/0428 713/150 |
| 2005/0005133 | A1* | 1/2005 | Xia | H04L 63/0807 713/185 |
| 2005/0198113 | A1* | 9/2005 | Mohamed | H04L 67/1097 709/203 |
| 2006/0153176 | A1* | 7/2006 | Caswell | H04M 7/1295 370/356 |
| 2007/0112576 | A1* | 5/2007 | Avery | G06Q 10/06393 705/7.39 |
| 2007/0123216 | A1* | 5/2007 | Cantini | H04L 63/0853 455/411 |
| 2007/0156850 | A1* | 7/2007 | Corrion | G06F 21/6218 709/219 |
| 2007/0162605 | A1* | 7/2007 | Chalasani | H04L 12/581 709/227 |
| 2007/0186099 | A1* | 8/2007 | Beck | G06F 21/34 713/159 |
| 2007/0214241 | A1* | 9/2007 | Song | H04L 12/4625 709/219 |
| 2007/0257104 | A1* | 11/2007 | Owen | G06F 21/32 235/380 |
| 2008/0052390 | A1* | 2/2008 | Jones | H04L 12/4641 709/224 |
| 2008/0091604 | A1* | 4/2008 | Wary | G06F 21/6227 705/50 |
| 2008/0201474 | A1* | 8/2008 | Yamada | H04L 29/06 709/226 |
| 2009/0132111 | A1 | 5/2009 | Macchia et al. | |
| 2009/0138643 | A1* | 5/2009 | Charles | H04L 63/0853 710/301 |
| 2009/0216975 | A1* | 8/2009 | Halperin | G06F 9/45537 711/162 |
| 2009/0222545 | A1* | 9/2009 | Yuki | H04L 12/2818 709/223 |
| 2009/0257595 | A1* | 10/2009 | de Cesare | G06F 21/575 380/277 |
| 2010/0011055 | A1* | 1/2010 | Lin | G06F 13/426 709/203 |
| 2010/0061229 | A1* | 3/2010 | Maisch | H04L 12/40176 370/222 |
| 2010/0096452 | A1* | 4/2010 | Habraken | G06Q 20/327 235/382 |
| 2010/0100652 | A1* | 4/2010 | Lin | G06F 3/023 710/73 |
| 2010/0146611 | A1* | 6/2010 | Kuzin | H04L 63/0815 726/8 |
| 2010/0165997 | A1* | 7/2010 | Matsumoto | H04L 41/0806 370/400 |
| 2010/0174812 | A1 | 7/2010 | Thomas et al. | |
| 2010/0268812 | A1* | 10/2010 | Mohrmann | G06F 21/53 709/224 |
| 2011/0204142 | A1* | 8/2011 | Rao | G06Q 10/06 235/380 |
| 2011/0219148 | A1* | 9/2011 | Lee | H04L 67/42 710/13 |
| 2011/0315763 | A1* | 12/2011 | Hochmuth | G06F 15/16 235/380 |
| 2012/0151369 | A1* | 6/2012 | Kominac | H04L 67/02 715/740 |
| 2012/0222138 | A1* | 8/2012 | Aaron | G06F 21/10 726/30 |
| 2012/0238284 | A1* | 9/2012 | Dyck | H04W 68/025 455/452.2 |
| 2013/0276073 | A1* | 10/2013 | Sanda | G06F 21/33 726/5 |

OTHER PUBLICATIONS

Botteck, M. et al., "Personal networks and Multimedia rendering", Consumer Electronics, (Apr. 14, 2008), pp. 1-4.
"Remote desktop software", Internet Citation, (Apr. 26, 2010), pp. 1-3.
"Secure Portable Office", AVAYA, avaya.com, pp. 1-3, (printed on Sep. 18, 2013).
International Search Report for PCT/EP2012/052411, mailed Apr. 4, 2012.
Foreign-language Written Opinion of the International Searching Authority for PCT/EP2012/052411, mailed Apr. 4, 2012.

* cited by examiner

METHOD AND DEVICE FOR CONNECTING TO A HIGH SECURITY NETWORK

This application is the U.S. national phase of International Application No. PCT/EP2012/052411, filed 13 Feb. 2012, which designated the U.S. and claims priority to FR Application No. 11/52369, filed 22 Mar. 2011, the entire contents of each of which are hereby incorporated by reference.

BACKGROUND OF THE INVENTION

1. Field of the Invention

The present invention concerns the field of access to a high-security network, and more particularly a device affording secure access, for example for management and maintenance operations.

2. Description of the Background Art

In many fields, sensitive sites are managed by an information system requiring a high security level and therefore high-security access control. Examples that can be cited are nuclear power stations, space installations, aircraft, both civil and military, submarines, etc.

The information systems that manage these sites share a constraint of high reliability and safety requirements. Security takes several forms, integrity, confidentiality, availability, reliability, anti-intrusion and traceability of interventions, among other things. These systems comply with strict specifications aiming at ensuring this security level.

In particular, it is said of a system, an apparatus or even a user, that it/he is trusted if it/he meets the specifications and is managed according to the prescribed safety procedures. On the other hand, a system or apparatus not complying with these procedures is non-trusted.

High-security information systems must therefore be trusted and comply with the safety specifications. During their normal operation, these systems are typically isolated and their security level can therefore be guaranteed.

However, these systems must undergo maintenance operations. These maintenance operations comprise management of the system, changes in parameters and adaptations. They also comprise recovery of operational data (log data). Finally, they comprise the updating of software modules to enable the system to develop. These actions are very tricky in terms of security, since a trusted system is modified and it is therefore essential to guarantee that the reliability of the system cannot be compromised during this operation.

These maintenance operations require the connection of a system external to the high-security system. This external system must then itself be trusted, meaning be managed according to accurate specifications consistent with the high-security system in order to guarantee the trusting of the maintenance operation.

FIG. 1 describes such a system. The high-security system 1.1 is composed of a communications network 1.3 that connects several sub-systems, typically computers 1.4 and 1.5 responsible for managing the site. An access point 1.6 is also connected to the communications network. This access point enables a terminal 1.7 dedicated to the maintenance of the system to be connected on demand. The connection between the maintenance terminal 1.7 and the access point 1.6 may be made by a wired connection such as an Ethernet connection, or a wireless connection such as WiFi or the like. Generally the access point 1.6 has a firewall for limiting the flows of data passing through the link 1.8 to the flows strictly necessary and provided for the maintenance of the system. The maintenance terminal is typically a portable computer that is connected to the network of the secure system. Typically, when the connection link 1.8 is not a direct wired link, for example when it is a wireless link or a link through a network, the connection 1.8 is protected by means of an encrypted tunnel between the terminal 1.7 and the access point 1.6.

The trusted perimeter is defined as the boundary separating the high-security system and its peripherals on one hand, all the elements of which must all be trusted, and on the other hand, the external apparatus and networks not complying with the same constraints.

Maintenance of the security rules requires the trusted perimeter 1.1 then to be extended to a trusted perimeter 1.1 plus 1.2, which comprises the maintenance apparatus. Typically the maintenance apparatus is said to be trusted and must comply with strict management rules. Typically this apparatus must comprise only the prescribed software modules and must be manipulated solely by authorised persons who are duly identified. It must be stored in a restricted-access space, a safe for example, outside the maintenance operations. These rules described here are merely a non-exhaustive example of the rules applicable in a particular case. In all cases, the management of this maintenance apparatus proves to be a difficult and constraining process to manage for the operator of the high-security system.

BRIEF SUMMARY OF THE INVENTION

The invention aims to solve the above problems by a connection device enabling any maintenance apparatus to be connected to a high-security network without compromising the trust in the system. The device contains a client of the maintenance application, only the inputs/outputs of which being offloaded onto the maintenance apparatus. It has authentication means and means for performing a protocol break between the maintenance apparatus and the high-security system. In this way, only the connection device must be trusted and the maintenance can be done from any terminal.

The invention concerns a connection device that comprises: a first connection link enabling said device to be connected to a high-security system; a second connection link enabling said device to be connected to a terminal; a maintenance client being able to dialogue through the first connection link with a maintenance server within said high-security system; a remote connection server enabling a user to control the maintenance client from said terminal; and which does not comprise any routing means for enabling a data stream to pass between said terminal and said high-security system.

According to a particular embodiment of the invention, it also comprises a firewall on the first connection link in order to control the flows between said device and said high-security system and a firewall on the second connection link to control the flows between said device and the terminal.

According to a particular embodiment of the invention, it also comprises authentication means for authenticating the user.

According to a particular embodiment of the invention, it comprises means for making the start-up of the system dependent on the successful authentication of the user.

According to a particular embodiment of the invention, it comprises means for making the establishment of an encrypted tunnel between said device and said high-security system dependent on the successful authentication of the user.

According to a particular embodiment of the invention, it comprises a chip-card component for storing authentication credits and the cryptological means necessary for establishing an encrypted tunnel between said device and the high-security system.

According to a particular embodiment of the invention, it also comprises means for mounting an available volume of said terminal so as to make it accessible to the maintenance client.

The invention also concerns a method for connecting a maintenance terminal to a maintenance server in a high-security system by means of a previously described connection device, which comprises a step of connecting said device to the terminal; a step of establishing a tunnel between said device and said high-security system; a step of remotely connecting from said terminal to said device and a step of connecting said maintenance client to the maintenance server via said remote connection.

According to a particular embodiment of the invention, it also comprises a step of authenticating the user and a step of making dependent the start-up of the system of the device made dependent on the success of the authentication step.

According to a particular embodiment of the invention, it also comprises a step of authenticating the user and a step of making dependent the establishment of said tunnel made dependent on the success of the authentication step.

BRIEF DESCRIPTION OF THE DRAWINGS

The features of the invention mentioned above, as well as others, will emerge more clearly from a reading of the following description of an example embodiment, said description being given in relation to the accompanying drawings, among which.

DETAILED DESCRIPTION OF THE INVENTION

Figure 1:
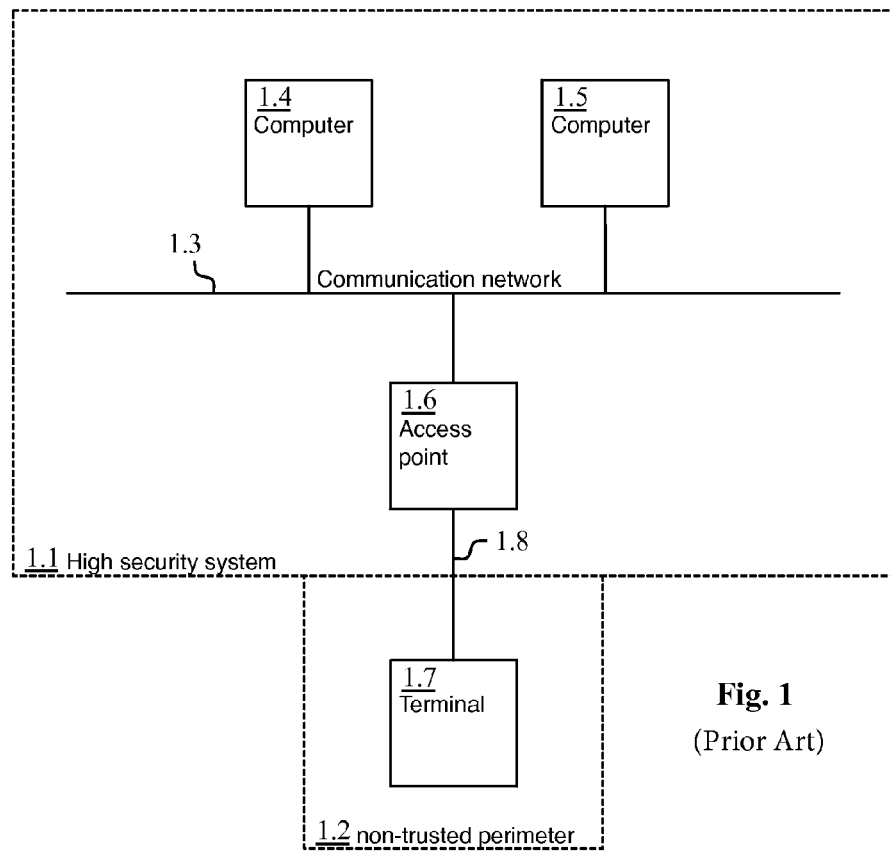
FIG. 1 illustrates the general architecture of a high-security system and its maintenance apparatus according to the prior art.

The invention is based on the use of a connection device 2.9 that enables a maintenance terminal 2.7 to be connected to a high-security network by means of its access point 2.6. Unlike the prior art, which required an extension of the trusted perimeter 1.1 plus 1.2 that includes the maintenance terminal 1.7, the invention allows an extension of this trusted perimeter 2.10 that does not include said connection device or the maintenance terminal per se. Through its design, the security procedures that have to be applied to the management of this connection device to ensure trust are less onerous than those that have to be applied to a trusted terminal. Any terminal may be used for the maintenance operations without requiring any special management, this not forming part of the trusted perimeter.

Figure 2:
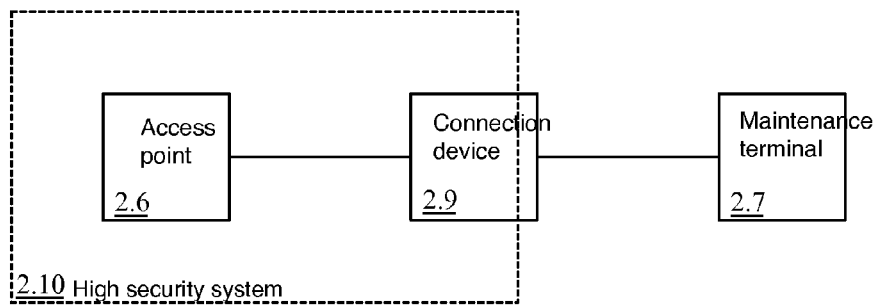
FIG. 2 illustrates the general architecture of the invention.
Figure 3:
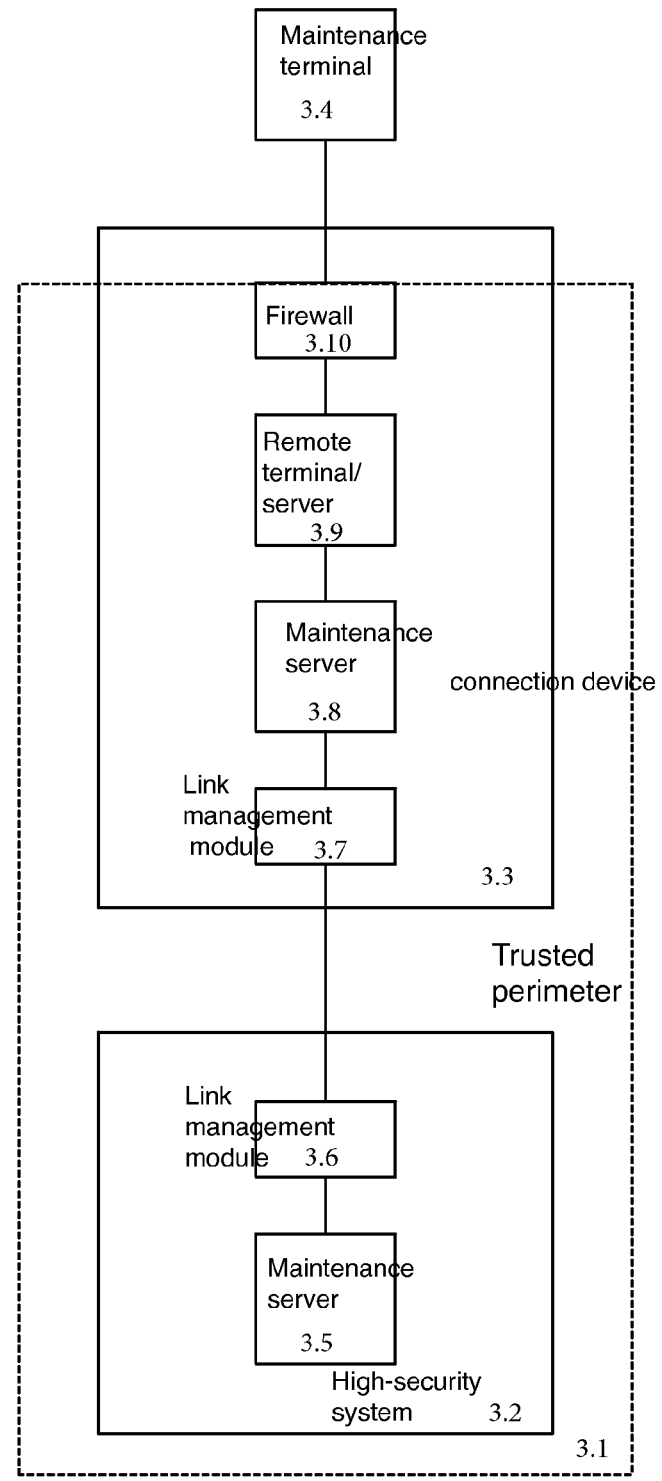
FIG. 3 illustrates the software architecture of the invention.

The general software architecture of the invention is illustrated by FIG. 3. This figure details FIG. 2. The trusted perimeter 3.1 can be seen, which comprises the high-security system 3.2 per se and the connection device 3.3. Outside this trusted perimeter, the maintenance terminal 3.4 enables the operator to manage the maintenance of the system. The maintenance operations are managed on a client-server mode. The high-security system hosts a maintenance server 3.5 that dialogues with a maintenance client 3.8 hosted by the connection device. Typically, the client allows the display of a maintenance menu for choosing a type of maintenance operation, which comprises for example parameterising operations, the recovery of operational data and the updating of software modules in the system 3.2.

The connection link between the device 3.3 and the system 3.2 is managed by the link management modules 3.6 and 3.7. The technology of said link may be of any type, wired or wireless, direct or passing through a communications network. Typically it is an Ethernet or WiFi connection link optionally passing through the network of the management operator of the system. The network in question is not necessarily a trusted network. This is because the modules 3.6 and 3.7 establish an encrypted tunnel between the trusted device and the system. It is this encrypted tunnel that guarantees the trusted perimeter between the two items of apparatus, whatever the underlying transport layer used. Advantageously, the link management modules also comprise a firewall module for ensuring that only the data streams exchanged between the client 3.8 and the maintenance server 3.5 can pass over the link.

The connection device 3.3 is typically devoid of any input/output means apart from the links connecting it to the system on one hand and the maintenance terminal on the other hand. According to the preferred embodiment, it is a simple device of the "USB key" type. It is therefore necessary for the user managing the maintenance to be able to control the client 3.8 from the maintenance terminal 3.4. To do this the connection device also comprises a remote connection terminal 3.9 that makes it possible to offload the display of the client 3.8 onto the maintenance terminal 3.4. Symmetrically, the inputs of the terminal are redirected to the remote connection server 3.9 in order to operate on the client 3.8. These inputs are typically inputs on the keyboard and the pointing peripheral, mouse or the like.

The RDP protocol (Remote Desktop Protocol) of Microsoft may be used, or the protocols offered by CITRIX.

The link between the connection device 3.3 and the terminal 3.4 may be based on any technology. The embodiment describes a connection by means of a serial link of the USB (Universal Serial Bus) type, but any other technology may be used, wired such as Ethernet or a wireless technology such as Bluetooth. Advantageously, a firewall 3.10 ensures that only the expected input-output streams can pass over the link between the terminal and the connection device 3.10.

The device is based on an operating system that enables making the described modules operate. Advantageously, the device further has means for authenticating the user, for example a fingerprint reader. The start-up of the operating system or simply the establishment of the tunnel with the high-security system may be subject to validation of the authentication. The device also has authentication credits, for example in the form of digital certificates, for establishing said tunnel. According to a particular embodiment of the invention, the authentication credits and the cryptographic means necessary for the establishment of the tunnel are integrated in the device in the form of a chip-card component. According to another embodiment, the whole architecture of the device is integrated in a chip-card component.

It should be noted that the device does not act as a gateway. It does not comprise any routing means that can enable a data stream to pass between the maintenance terminal 3.4 and the high-security system 3.2. This protocol break is essential for ensuring security of the system.

Figure 4:
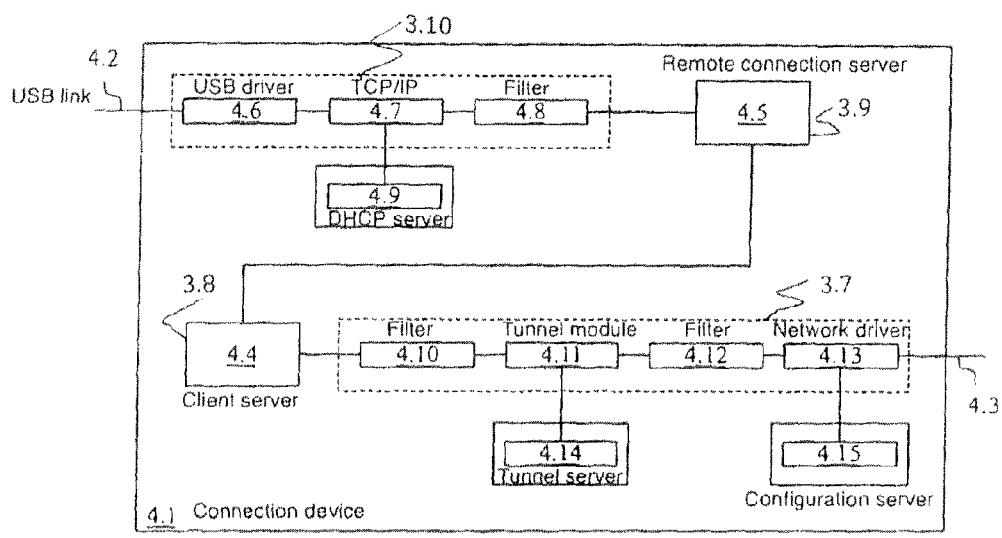
FIG. 4 illustrates the software architecture of an example embodiment of the device according to the invention.

FIG. 4 illustrates the software architecture of the connection device 4.1 of the embodiment of the invention. In this example, the link to the maintenance terminal is a USB link 4.2. The operating system is a system derived from the "Linux" free system. The link is managed by the first link management module 3.7 that comprises the modules 4.6, 4.7 and 4.8 in the kernel of the operating system, which is illustrated by the rectangle in broken lines. The module 4.6 is the driver of the USB link. The module 4.7 provides the TCP/IP network layer for communicating with the terminal. This module is for example based on the Microsoft RNDIS (Remote Network Driver Interface Specifications) protocol. To obtain the parameters of the network, typically its IP address, it cooperates with a local DHCP (Dynamic Host Control Protocol) server 4.9. Advantageously, the latter functions in isolation within the system for security reasons. This isolation consists of separating the execution of the process in its own space in the operating system. It is possible for example to use the jail mechanism existing in the Linux system. The advantage is that an attacker succeeding in taking control of the process remains isolated in the jail and cannot see the rest of the system.

The module 4.8 is a filtering function of the application or network firewall type that limits the flows exchanged with the terminal to the authorised flows, typically the flows of the RDP protocol.

The remote connection server 4.5 is based on RDC in this example. It enables the terminal to display the interface of the client 4.4 and to interact with it. The client 4.4 is a proprietor client that depends on the concerned high-security system. It is designed to connect to the corresponding maintenance server in the high-security system. The modules 4.5 of the remote connection server and 4.4 of the maintenance client are executed in the application space of the operating system.

The link to the system is managed by the second link management module 3.10 that comprises the modules 4.10, 4.11, 4.12 and 4.13 implemented in the space of the kernel of the operating system. The module 4.11 implements the encrypted tunnel in cooperation with the tunnel server 4.14. Advantageously, the tunnel server also operates in isolation in a jail. Any encrypted tunnel protocol may be used, for example IPsec (Internet Protocol Security), but also SSL (Secure Socket Layer), PPTP (Point to Point Tunnelling Protocol), or the like. The module 4.13 is the network driver, typically an Ethernet driver, that establishes the link with the high-security system in cooperation with another DHCP network configuration server 4.15. The latter is also advantageously isolated in a jail. The link 4.3 forms the physical connection with the high-security system. This link may be a cabled link, for example of the Ethernet or other type. It may also be of the wireless type such as WiFi or radio frequency. Advantageously, the device has a physical cable connection port and a wireless interface, the two being able to be used as suits the user.

The modules 4.10 and 4.12 are flow filtering modules (of the firewall type) for controlling the exchanged flows coming from the interface 4.3: the module 4.10 filters the content of the flows (filtering of the application type, top layer) while the module 4.12 allows only flows according to network criteria.

Means for authenticating the user (not shown) advantageously make the start-up of the system or the establishment of the tunnel dependent on this. These means may be various. Non-limitative examples are a fingerprint reader or other biometric sensor, a system for a personal code to be entered, a radio-frequency (RFID) tag reader.

Figure 5:
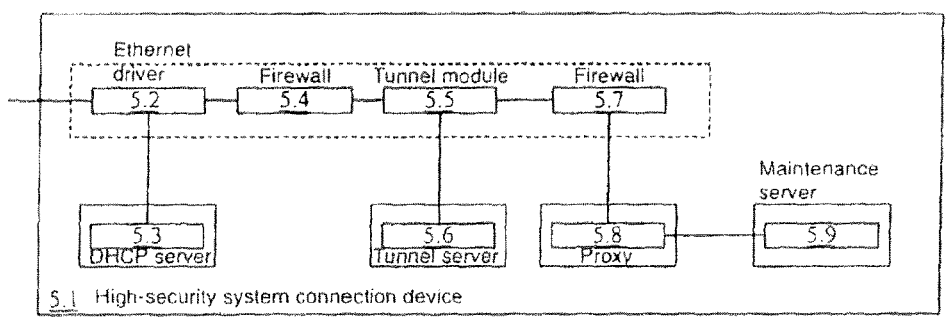
FIG. 5 illustrates the software architecture managing the connection of the device in the high-security system according to an example embodiment of the invention.

FIG. 5 illustrates the software architecture managing the connection of the device in the high-security system according to an example embodiment of the invention. This architecture to great extent repeats the symmetrical architecture of the device with regard to the management of the link between the two. Once again there is the Ethernet driver 5.2 that cooperates with a DHCP network configuration server 5.3. Downstream, a firewall module 5.4 controls the flows passing through. An encrypted tunnel management module 5.5 manages the tunnel on the system side in cooperation with the tunnel server 5.6. A second firewall 5.7 filters the decrypted flows issuing from the tunnel. Advantageously, the data flow between the maintenance client 4.4 and the maintenance server 5.9 passes through a relay module (proxy) 5.8 in order to avoid direct connection and to allow filtering on the exchanged data. The DHCP modules, tunnel server and relay are advantageously isolated in respective jails.

Figure 6:
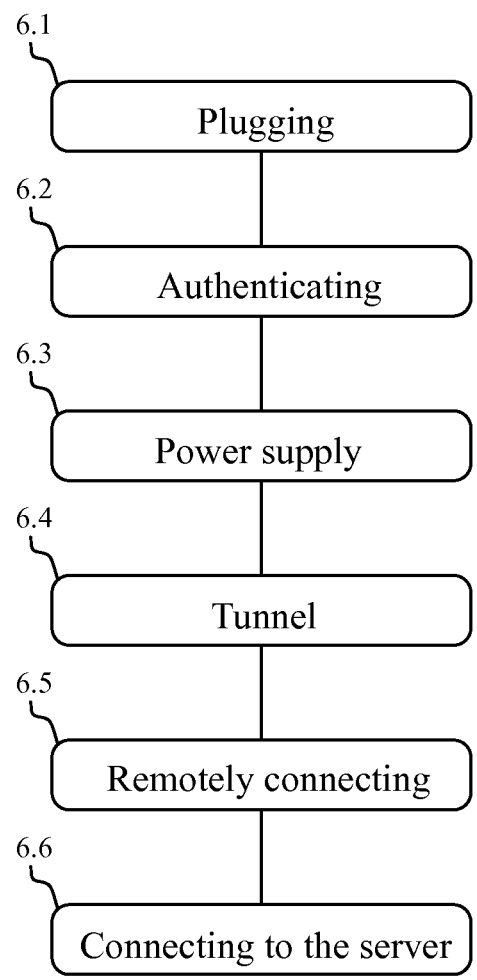
FIG. 6 illustrates the method for connecting a maintenance terminal to a high-security system according to an example embodiment of the invention.

FIG. 6 illustrates the method for connecting a maintenance terminal to a maintenance server in a high-security system according to one embodiment of the invention. During a step 6.1, the device is connected to the terminal. In some embodiments, this is a connection via a connection link according to the type of link between the terminal and the device. Advantageously, the authentication of the user via the authentication means occurs during step 6.2. If this authentication is positive, the system starts up. This may be powering up, supply of the motherboard, the starting of the system or simply authorisation of the establishment of the tunnel. The tunnel between the device and the host system is then established during step 6.4. The remote connection server is started up and the connection is established between the terminal and the device during step 6.5. This step may be performed before or after the establishment of the tunnel. During step 6.6, the user uses, via the remote connection, the maintenance client hosted on the device in order to establish the connection to the maintenance server.

Advantageously, the operating system of the device further enables mounting a volume external to the device. In this way, the maintenance client may access said volume. This volume may serve to read software versions that can be downloaded to the high-security system for software updates. These updates are advantageously encrypted and signed modules the confidentiality, origin and integrity of which can be ensured. The remote volume may also serve to store the operational data recovered from the high-security system. According to the embodiment, the remote volume made accessible to the connection device may be a predefined local volume of the maintenance terminal, or a read-only optical reader, and does not therefore allow storage. It may also be a volume available on the network of the operator to which the maintenance terminal can be connected. The mounting may be done according to any standard protocol for mounting a remote volume, for example NFS (Network File System) or an implementation of SMB/CIFS (Server Message Block/Common Internet File System) such as Samba.

The invention claimed is:

1. A maintenance system to insure maintenance of a high-security system by means of a client/server mode maintenance application, said maintenance system comprising:
- a maintenance terminal and said high-security system comprising a maintenance server of said client/server mode maintenance application, wherein said maintenance system further comprises a connection device (3.3) devoid of any input/output means apart from a first connection link (4.3) adapted to link said connection device to said high-security system and a second connection link (4.2) adapted to link said connection device (3.3) to said maintenance terminal (3.4), said connection device further including:
- a proprietor maintenance client (3.8) that depends on the high-security system and that connects to a maintenance server (3.5) of said high-security system via said first connection link (4.3) for controlling said maintenance server (3.5), said proprietor maintenance client (3.8) generating a display resulting from a control operation of said maintenance server (3.5) of a high-security system, and
- a remote connection server (3.9) connected via the second connection link (4.2) to said maintenance terminal (3.4),
- wherein said remote connection server (3.9) being constructed to offload onto said maintenance terminal (3.4) the display generated by said proprietor maintenance client (3.8) resulting from the control operation of said maintenance server (3.5) of said high-security system and to offload onto said maintenance client (3.8) inputs issued from a keyboard or a pointing peripheral of said maintenance terminal (3.4), said maintenance client (3.8) then controlling the maintenance server (3.5) according to said inputs,
- said connection device further comprising a sensor for authenticating the user,
- said connection device further comprising a chip-card component for storing authentication credits and the cryptographic means necessary for establishing an encrypted tunnel between said device and the high-security system.

2. The maintenance system according to claim 1, said connection device further comprising:
- a firewall on the first connection link for controlling the flows between said device and the high-security system;
- a firewall on the second connection link for controlling the flows between said device and the maintenance terminal.

3. The maintenance system according to claim 1, said connection device further comprising a chip-card component for making the start-up of the system dependent on the successful authentication of the user.

4. The maintenance system according to claim 1, said connection device further comprising authentication credits for establishing an encrypted tunnel between said device and said high-security system, dependent on the successful authentication of the user.

5. The maintenance system according to claim 1, said connection device further comprising a file system for mounting an available volume of said terminal so as to make the file system accessible to the maintenance client.

* * * * *